US012594567B2

(12) United States Patent
Vadnere et al.

(10) Patent No.: US 12,594,567 B2
(45) Date of Patent: Apr. 7, 2026

(54) BALER NOZZLE EVALUATION SYSTEM AND METHOD

(71) Applicant: Deere & Company, Moline, IL (US)

(72) Inventors: Mohan A. Vadnere, Pune (IN); Mahesh Somarowthu, Pune (IN)

(73) Assignee: DEERE & COMPANY, Moline, IL (US)

( * ) Notice: Subject to any disclaimer, the term of this patent is extended or adjusted under 35 U.S.C. 154(b) by 484 days.

(21) Appl. No.: 18/175,157

(22) Filed: Feb. 27, 2023

(65) Prior Publication Data

US 2024/0286160 A1     Aug. 29, 2024

(51) Int. Cl.
| | |
|---|---|
| *B05B 12/00* | (2018.01) |
| *A01F 15/08* | (2006.01) |
| *G06K 19/07* | (2006.01) |
| *G08B 21/18* | (2006.01) |
| *G09F 3/02* | (2006.01) |

(52) U.S. Cl.
CPC ........ *B05B 12/004* (2013.01); *A01F 15/0816* (2013.01); *G08B 21/18* (2013.01); *G06K 19/0723* (2013.01); *G09F 3/02* (2013.01)

(58) Field of Classification Search
CPC ... B05B 12/004; B05B 15/50; A01F 15/0816; A01F 15/07; G08B 21/18; G06K 19/0723; G09F 3/02
See application file for complete search history.

(56) References Cited

U.S. PATENT DOCUMENTS

| | | | |
|---|---|---|---|
| 2006/0265106 A1 | 11/2006 | Giles et al. | |
| 2022/0062922 A1 | 3/2022 | Ferren et al. | |
| 2022/0062934 A1 | 3/2022 | Ferren et al. | |
| 2022/0272904 A1 | 9/2022 | Roberge et al. | |
| 2023/0097284 A1* | 3/2023 | Knopf .................... | A01D 46/30 56/328.1 |

FOREIGN PATENT DOCUMENTS

| | | |
|---|---|---|
| JP | 2019122985 A | 7/2019 |
| KR | 20130091809 A | 8/2013 |

OTHER PUBLICATIONS

Extended European Search Report and Written Opinion issued in European Patent Application No. 24158037.2 dated Apr. 17, 2024, in 10 pages.

* cited by examiner

*Primary Examiner* — Nicole Coy
(74) *Attorney, Agent, or Firm* — KLINTWORTH & ROZENBLAT LLP

(57) ABSTRACT

A nozzle evaluation system is provided for an agricultural baler with a nozzle apparatus having at least one nozzle. The system includes a sensor associated with the at least one nozzle and configured to collect vibration patterns of sound emanating from the at least one nozzle of the nozzle apparatus during application of a fluid upon a respective bale; and a controller configured to: receive the vibration patterns collected by the sensor during application of the fluid upon the respective bale; evaluate the vibration patterns for the at least one nozzle for a clog condition; and record, upon detecting the clog condition based on the vibration patterns, information associated with clog condition.

17 Claims, 4 Drawing Sheets

260

262

266

264

BALER NOZZLE EVALUATION SYSTEM AND METHOD

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to machines for forming bales of crop material, such as hay, and particularly to evaluating issues associated with nozzles that apply a preservative to the crop material as the bale is being formed.

BACKGROUND OF THE DISCLOSURE

In agricultural operations, balers may be used to create round or square bales. Typically, such bales are stored outdoors where they are exposed to the elements of rain and snow. As such, preservatives may be applied to the bales in order to prevent mold growth and other issues associated with storing the bales.

SUMMARY OF THE DISCLOSURE

The disclosure provides agricultural operation evaluation systems and methods.

In a one aspect, a nozzle evaluation system is provided for an agricultural baler with a nozzle apparatus having at least one nozzle. The system includes a sensor associated with the at least one nozzle and configured to collect vibration patterns of sound emanating from the at least one nozzle of the nozzle apparatus during application of a fluid upon a respective bale. The system further includes a controller having a processor and memory architecture configured to: receive the vibration patterns collected by the sensor during application of the fluid upon the respective bale; evaluate the vibration patterns for the at least one nozzle for a clog condition; and record, upon detecting the clog condition based on the vibration patterns, information associated with clog condition.

In nozzle evaluation system, the sensor may be a microelectromechanical system (MEMS) sensor.

In nozzle evaluation system, the controller may be configured to engage, upon detecting the clog condition, an actuator of the agricultural baler.

In nozzle evaluation system, the actuator may be an identification apparatus configured to attach an identification tag to the respective bale.

In nozzle evaluation system, the controller may be configured to command the recording, upon detecting the clog condition, of the information associated with the clog condition on the identification tag attached by the identification apparatus to the respective bale.

In nozzle evaluation system, the controller may be configured to command the recording, upon detecting the clog condition, of the information associated with the clog condition that includes a location of the respective bale upon discharge.

In nozzle evaluation system, the controller may be configured to generate, upon detecting the clog condition, an alert for an operator of the agricultural baler.

In nozzle evaluation system, the controller may be configured to communicate, upon detecting the clog condition, the information associated with the clog condition to a control center.

In nozzle evaluation system, the controller may be configured to, upon detecting the clog condition, classify the clog condition.

In nozzle evaluation system, the controller may be configured to classify the clog condition with a neural network.

In nozzle evaluation system, the sensor may be embedded within the at least one nozzle.

In a further aspect, a baler arrangement is provided. The baler arrangement includes a baler configured to collect crop material and form a bale from the crop material, the baler including a preservative application subsystem with a nozzle apparatus configured to spray the bale with a fluid during operation; a sensor associated with the nozzle apparatus and configured to collect vibration patterns of sound emanating from the nozzle apparatus during the spraying of the fluid upon the bale; and a controller having a processor and memory architecture. The controller is configured to: receive the vibration patterns collected by the sensor during the spraying of the fluid upon the respective bale; evaluate the vibration patterns for the at least one nozzle for a clog condition; and record, upon detecting the clog condition based on the vibration patterns, information associated with clog condition.

In the baler arrangement, the sensor is a microelectromechanical system (MEMS) sensor.

In the baler arrangement, the baler may further include an identification apparatus configured to attach an identification tag to the bale; and the controller may be configured to command the recording, upon detecting the clog condition, of the information associated with the clog condition on the identification tag attached by the identification apparatus to the bale.

In the baler arrangement, the controller may be configured to command the recording, upon detecting the clog condition, of the information associated with the clog condition that includes a location of the bale upon discharge.

In the baler arrangement, the controller may be configured to generate, upon detecting the clog condition, an alert for an operator of the baler.

In the baler arrangement, the controller may be configured to communicate, upon detecting the clog condition, the information associated with the clog condition to a control center.

In the baler arrangement, the controller may be configured to, upon detecting the clog condition, classify the clog condition.

In the baler arrangement, the controller may be configured to classify the clog condition with a neural network.

In the baler arrangement, the sensor may be embedded within the nozzle apparatus.

BRIEF DESCRIPTION OF THE DRAWINGS

Like reference symbols in the various drawings indicate like elements.

DETAILED DESCRIPTION

The following describes one or more example embodiments of the disclosed system and method, as shown in the accompanying figures of the drawings described briefly above. Various modifications to the example embodiments may be contemplated by one of skill in the art. Discussion herein may sometimes focus on the example application, but the disclosed system and method is applicable to other types of work vehicles and/or other types of sprayer systems.

In agricultural operations, balers may be used to gather, compress, and shape crop material into a bale, including square (or parallelepiped shaped) bales and/or round (or cylindrical shaped) bales. Balers may include preservative application subsystems to spray preservatives or other liquids onto the bales in order to inhibit or prevent mold and other issues that may develop within the bales during storage. Such preservatives may be applied with nozzle apparatuses. Generally, a minimum amount of preservative should be applied to avoid crop damage while being efficient with the preservative. However, the nozzle apparatuses are subject to clogging for various reasons, particularly due to debris or particulate matter in the spaying liquid. Such clog conditions may impact both the individual bales and the overall spraying operation. For example, clog conditions may result in gaps or overlap for bales in the field, thereby degrading spraying effectiveness and complicating subsequent processing or collection of the bales. As such, it is beneficial to know when a nozzle apparatus is blocked and/or when the spray quality is inadequate.

According to the present disclosure, a baler nozzle evaluation system and method may be provided. In one example, the system and method function to detect and classify clogged nozzles by processing vibration patterns of sound waves resulting from fluid being sprayed through the nozzles (or blocked within the nozzles). The vibration patterns may be collected using microelectromechanical system (MEMS) sensors functioning as condenser microphones, which may be embedded in or proximate to the respective nozzle. In some examples, machine learning models or neural networks may be used to characterize the amount of blockage based on the sound wave vibration patterns. In response, the system may engage one or more types of actuators or functions, including providing an alert to an operator via a user interface; recording or storing location information, preservative application information, bale information and/or nozzle information; and/or tagging the bale itself with such information and/or a unique identifier that references such information.

Figure 1:
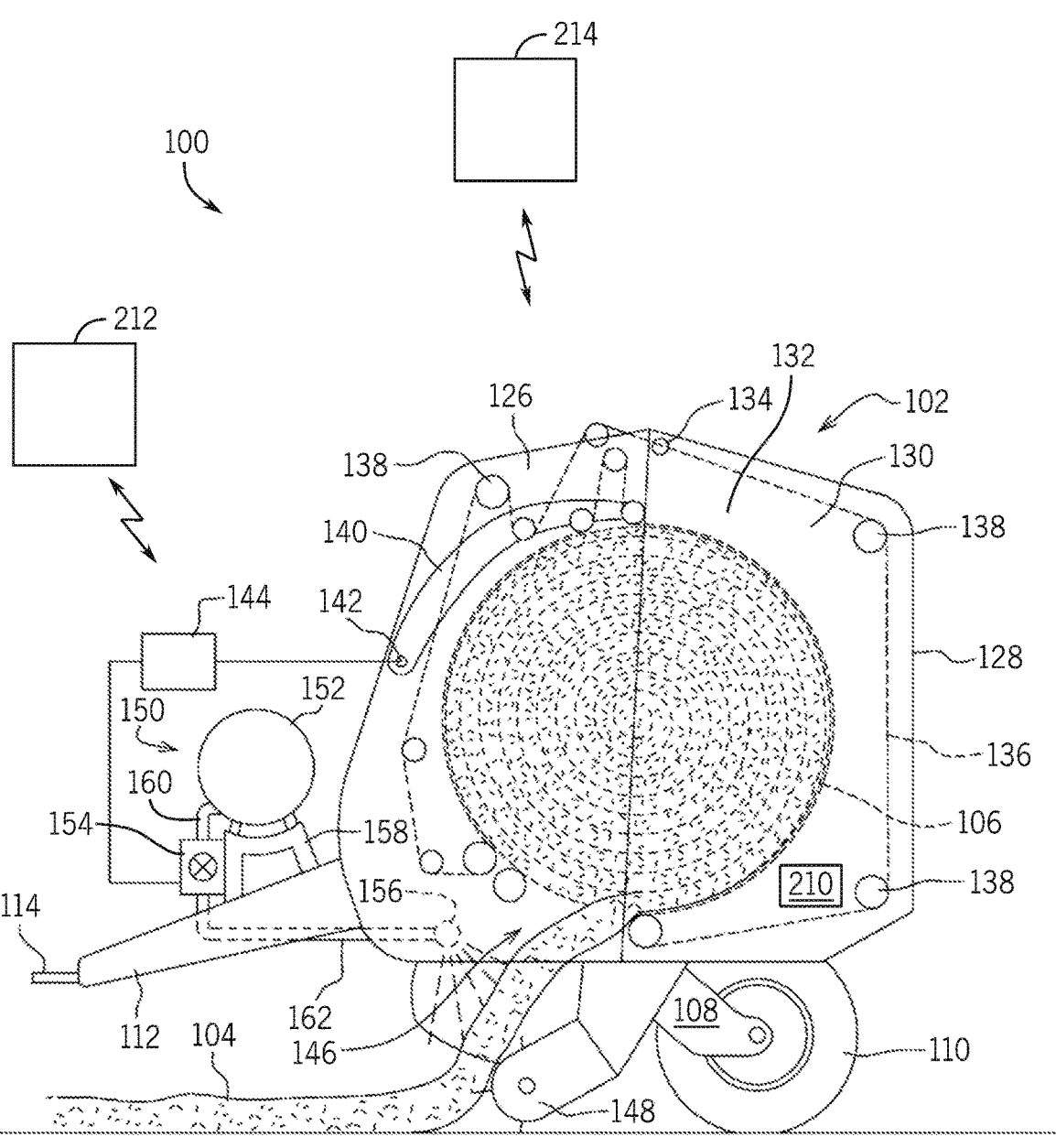
FIG. 1 is an elevational view of a baler arrangement with a round baler implementing a baler nozzle evaluation system and method according to an example embodiment.

Referring to FIG. 1, a baler arrangement 100 may include a round baler 102 and may implement a nozzle evaluation system and method, discussed in greater detail below after a brief description of an example baler. Although the view of FIG. 1 depicts a round baler, the nozzle evaluation system and method may be implemented in other types of balers, including square balers. The nozzle evaluation system and method are discussed in greater detail below after an overall description of the baler arrangement 100 and baler 102.

In general, a vehicle (not shown) such as a tractor may pull or otherwise power the baler 102 through a field or other work site in order to collect and form bales 106 prior to ejecting the formed bale 106 from the rear of the baler 102. In some embodiments, the baler 102 may be self-propelled, e.g., a vehicle and baler 102 may be configured as a single, self-propelled vehicle.

Aspects of the nozzle evaluation system and method, as well as the baler arrangement 100, may be implemented with a controller 144 positioned on the baler 102, positioned on the vehicle (not shown), or distributed across various locations. The controller 144 may be a dedicated controller for implementing aspects of the nozzle evaluation system and method described below, a broader controller for the baler 102, a more general controller for the overall baler arrangement 100, and/or aspects of any of the above.

In one example, the controller 144 may be implemented with processing architecture such as a processor and memory. For example, the processor may implement the functions described herein based on programs, instructions, and data stored in memory. As such, the controller 144 may be configured as one or more computing devices with associated processor devices and memory architectures, as a hard-wired computing circuit (or circuits), as a programmable circuit, as a hydraulic, electrical or electro-hydraulic controller, or otherwise. The controller 144 may be configured to execute various computational and control functionality with respect to the baler 102 (or other machinery). In some embodiments, the controller 144 may be configured to receive input signals in various formats (e.g., as hydraulic signals, voltage signals, current signals, and so on), and to output command signals in various formats (e.g., as hydraulic signals, voltage signals, current signals, mechanical movements, and so on). For example, the controller 144 may be in electronic or hydraulic communication with various actuators, sensors, and other devices within (or outside of) the baler arrangement 100, including any devices described below. Although not shown or described in detail herein, the controller 144 may include any number of additional or alternative systems, subsystems, and elements. Operation of the controller 144 within the context of the nozzle evaluation system and method is discussed in greater detail below.

The baler arrangement 100 may be considered to include or otherwise cooperate with an operator or user interface 212 that enables an operator to interface with the various aspects of the baler arrangement 100. The user interface 212 may be located on the vehicle that powers the baler 102, on the baler 102, and/or remote from the baler 102 and/or vehicle. In one example, the user interface 212 may be considered to include at least one user input device and/or a display device, either as separate devices or combined. The user input device of the user interface 212 is any device capable of receiving user input, including, but not limited to, a keyboard, a microphone, a touchscreen layer associated with the display device, or other device to receive data and/or commands from the user. The display device of the user interface 212 may include any technology for displaying information, including, but not limited to, a liquid crystal display (LCD), light emitting diode (LED), organic light emitting diode (OLED), plasma, or a cathode ray tube (CRT). In some embodiments, the user interface 212 may include output devices in addition to the display device, including speakers and haptic actuators.

The baler arrangement 100 may be considered to include or otherwise cooperate with a control (or data) center 214 that functions to provide additional data storage and/or processing to various aspects of the nozzle evaluation system and method described below. In some instances, the control center 214 may operate as a "backend" system or server that facilities operation within a harvest site or a group of harvest sites. In some arrangements, the control center 214 may be omitted. As described below, recording of the bale information by the controller 144 associated with the baler 102 and/or the control center 214 enables the tracking and management of the overall preservative application process.

Broadly, aspects of the baler arrangement 100, including the baler 102, the user interface 212, and/or the control center 214, may communicate in any suitable manner, including wired and/or wireless configurations. For example, a communication interface may function to enable wireless communication, including directly (e.g., via Bluetooth®, radio frequency signals, or the like) or over a network. Thus, such as communication interface may include a Bluetooth® transceiver, a radio transceiver, a cellular transceiver, an LTE transceiver, and/or a Wi-Fi transceiver. For example, such communications may utilize one or more of various communication techniques or mechanisms, including radio frequency, Wi-Fi, cellular, telematics, and/or any other suitable platforms.

Returning to the baler 102, as introduced above, the baler 102 functions to pick up crop material 104 from the ground and roll it up in a continuous spiral to form the bale 106. The baler 102 may include a main frame 108 supported on a pair of ground wheels 110. A draft tongue 112 has a rear end joined to the frame 108 and has a forward end defined by a clevis arrangement 114 adapted for being coupled to the towing vehicle (not shown). A pair of upright side walls 126 are fixed to the main frame 108 and define forward regions of opposite side walls of a baling chamber 132. A discharge gate 128 includes opposing upright side walls 130 defining opposite sides of a rear region of the baling chamber 132 and is mounted for pivoting vertically about a horizontal pivot arrangement 134 located at an upper rear location of the side walls 126. A gate cylinder arrangement (not shown) is coupled between the main frame 108 and the opposite side walls 130 of the discharge gate 128 and is selectively operable for moving the discharge gate 128 between a lowered baling position and an opened discharge position.

In this example, the baler 102 has of a variable size chamber design and thus includes a plurality of longitudinally extending side-by-side belts 136 supported on a plurality of rollers 138 (only a few of which are shown). In effect, the bale forming chamber is defined by the side walls 126, 130, the rollers 138, and belts 136.

During general operation, the baler 102 is drawn through a field by a prime mover (not shown) attached to the tongue 112. Crop material 104 is fed into a crop inlet 146 of the bale forming chamber from a windrow of crop on the ground by a pickup 148. Within the baler 102, the incoming crop is rolled up in a spiral fashion in a nip formed between oppositely moving adjacent loops of belts 136. The space between adjacent loops of belts 136 grows with the forming bale 106. Accordingly, a belt tensioning device 140 is provided to take up slack in the belts 136 as needed. Thus, the position of the tensioning device 140, at any given time, is an indication of the size of the bale 106 at that time. A bale diameter sensor 142 in the form of a potentiometer is affixed to the pivot point of the tensioning device 140 and thus provides an electrical signal correlating with bale diameter. Although not shown, additional sensors may be provided for sensing properties and/or characteristics of the bale 106, including moisture and weight sensors. Upon completion of bale formation, the bale 106 is wrapped with twine or other appropriate wrapping material and is discharged by actuation of gate cylinders that open the discharge gate 128, permitting the completed bale 106 to be discharged from the baler 102 onto the ground. Additional aspects of the baler 102 are discussed below.

As shown, the baler 102 further includes a preservative application subsystem 150 having at least one storage container such as holding tank 152, a transfer device such as variable speed pump 154 and at least one nozzle apparatus 156. Various alternative configurations and arrangements of the preservative application subsystem 150 may be provided. As discussed below, aspects of the preservative application subsystem 150 may be considered part of the baler nozzle evaluation system and method discussed below with reference to FIG. 4.

Generally, the variable speed pump 154 of the preservative application subsystem 150 may be a fixed speed pump, or in place of a pump, the subsystem 150 may have a pressurized tank and valve system or a gravity feed and valve system. As illustrated, the holding tank 152 and pump 154 are mounted upon a subframe 158 above the tongue 112 at the front of the baler 102. It will, however, be recognized that the tank and pump could be mounted at another location. The nozzle apparatus 156 may be in the form of one or more nozzle apparatuses mounted just ahead of and above the crop inlet 146 of the baler 102. An example nozzle apparatus 156 is described in greater detail below with reference to FIG. 2. Briefly, each nozzle apparatus 156 may have one or more nozzles that function to apply fixed or adjustable spray patterns of preservative. In particular, the tank 152 is connected to the pump 154 by way of a hose 160, and the pump 154 is, in turn, connected to the nozzle apparatus 156 by a hose 162. Thus, when the pump 154 is activated, preservative is drawn from the tank 152 via the hose 160 and sent to the nozzle apparatus 156 via the hose 162. The preservative is expelled from the nozzle apparatus 156 in a pattern generally designed to ensure contact with the incoming crop material.

The controller 144 may control the pump 154 by way of appropriate logic to start and stop the pump 154 and/or to control the speed of the pump and therefore the application rate of the preservative. Logic may be programmed in the controller 144 to start/stop and/or vary the speed of the pump 154 based upon the bale size data determined from the bale diameter sensor 142.

In one example embodiment, the baler 102, fitted with the preservative application subsystem 150, bale diameter sensor 142 and controller 144, is drawn through the field and a baling operation is commenced in a predetermined matter. As a bale 106 is being formed, the controller 144 maintains the pump 154 in an "off" state such that no preservative is being applied to the crop at all. When the bale 106 reaches a preselected diameter as determined by the controller 144 from the bale diameter sensor data, the controller 144 turns on the pump 154 and begins to apply preservative to the crop at a rate sufficient to fully treat at least the outer rind of the bale 106. The rate at which the preservative is applied and the diameter at which application commences may be preselected based upon the type of preservative being applied, the kind and condition of the crop, and the determination of the depth to which water is anticipated to penetrate the bale.

The data concerning desired depth of preservative application, bale size, and the like may be predetermined by the operator and programmed or entered into the controller 144. It is contemplated that an operator may select from a number of combinations of crop type, density, condition, and preservative type. Additional information regarding the operation of the preservative application subsystem 150, particularly within the context of a baler nozzle evaluation system and method, will be provided below.

The baler 102 may additionally include one or more actuators 210 to further interact with the bale 106 and/or other aspect of the baler 102. In one example, actuator 210 may be an identification apparatus 210 configured to attach an identification tag to the bale 106. In one implementation, the identification tag of the identification apparatus 210 includes a Radio Frequency Identification (RFID) tag. Generally, such a tag is operable to provide a respective identification code that is unique to that identification tag, and thus, to the bale 106, although additional information may be stored. In particular, the identification apparatus may install a tag that includes a radio transponder, a radio receiver, and a transmitter such that, in response to an electromagnetic interrogation signal, the identification tag may transmit digital data, such as but not limited to the identification code that is unique to that specific identification tag, as well as any other type of information associated with the tag and/or subject bale. As an example, the information stored on the tag may be provided to the control center 214, e.g., via the controller 144, the identification apparatus 210, the tag itself, and/or a combination thereof. In other words, the identification tag may be a "read-only" tag with a unique identifier with which additional information may be stored elsewhere, associated with the identifier, or a "read/write" tag on which any information may be stored, including information associated with the preservative application. In some examples, the identification apparatus 210 may include a location sensor, such as a global positioning system (GPS) sensor, that enables the identification apparatus 210 to determine and record the location of each bale for storage with the bale information or on the identification tag, particularly when the bale is discharged from the baler 102.

The identification apparatus 210 may include any mechanism for attaching the identification tag to the bale 106. In one implementation, the identification apparatus 210 uses twine or other filament to couple the tag to the bale 106 by weaving or otherwise securing the filament to the bale 106 and/or to the wrap applied to the bale 106. In other examples, the identification apparatus 210 may use a sticker or pin to secure the tag to the bale 106. As described below, the tag of the identification apparatus 210 provides a mechanism for identifying and tracking data related to a bale of crop material and an overall baling operation. Additional information regarding information associated with the tag applied by the actuator 210 is provided below.

Figure 2:
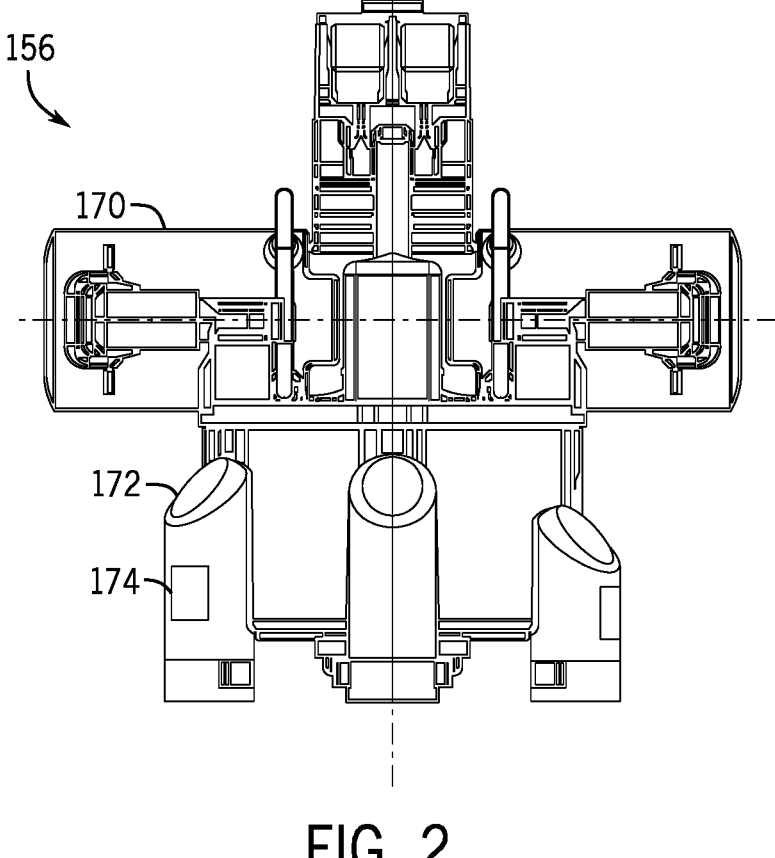
FIG. 2 is a cross-sectional view of a nozzle apparatus that may be incorporated into the baler of FIG. 1 according to an example embodiment.

As introduced above, reference is now made to FIG. 2 which is a cross-sectional view of an example nozzle apparatus 156 that may be implemented in the preservative application subsystem 150. Generally, the nozzle apparatus 156 includes one or more flow conduits extending through a manifold 170 that distributes the fluid from hose 162 (FIG. 1) though one or more nozzles (or nozzle heads) 172. Any number of nozzles 172 may be provided. The nozzle apparatus 156 further includes one or more sensors 174. In one example, one sensor 174 is associated with each nozzle 172. In other examples, a sensor 174 may be associated with groups of nozzles 172. Moreover, in the depicted example, the sensors 174 are mounted to or embedded in the nozzles 172. However, in other examples, the sensors 174 may be arranged proximate to the nozzles 172. As discussed below, the sensors 174 are generally arranged to detect vibrations as the preservative flows through or is clogged within the nozzles 172.

Figure 3:
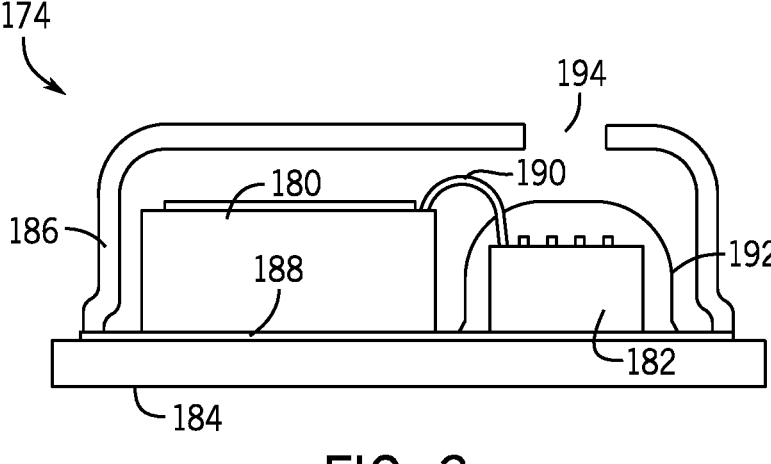
FIG. 3 is an example view of a sensor that may be incorporated into the nozzle apparatus of FIG. 2 according to an example embodiment.

Reference is briefly made to FIG. 3, which is a view of an example sensor 174 that may be incorporated into or otherwise associated with the nozzle apparatus 156 of FIG. 2. In one example, the sensor 174 may be a microelectromechanical sensor (MEMS) sensor or other type of transducer 180 that converts sound vibrations into electrical signals. The transducer 180 may be mounted with an integrated circuit 184 on a circuit board 182. As is typical, the transducer 180 and/or integrated circuit 184 may be enclosed by a cover 186, secured to the circuit board 182 with sealing material 188, coupled to one another with a connector 190, and encapsulated with molding 192. Any sensor configuration may be provided. During operation, vibrations may be admitted into the sensor via a port 194 in the cover 186, and the transducer 180 converts the vibration patterns into electrical signals that may be processed and/or transmitted by the integrated circuit 184 to the controller 144 (FIG. 1) for further processing, particularly to identify and/or evaluate a clog condition within the nozzle apparatus 156, as described below.

Figure 4:
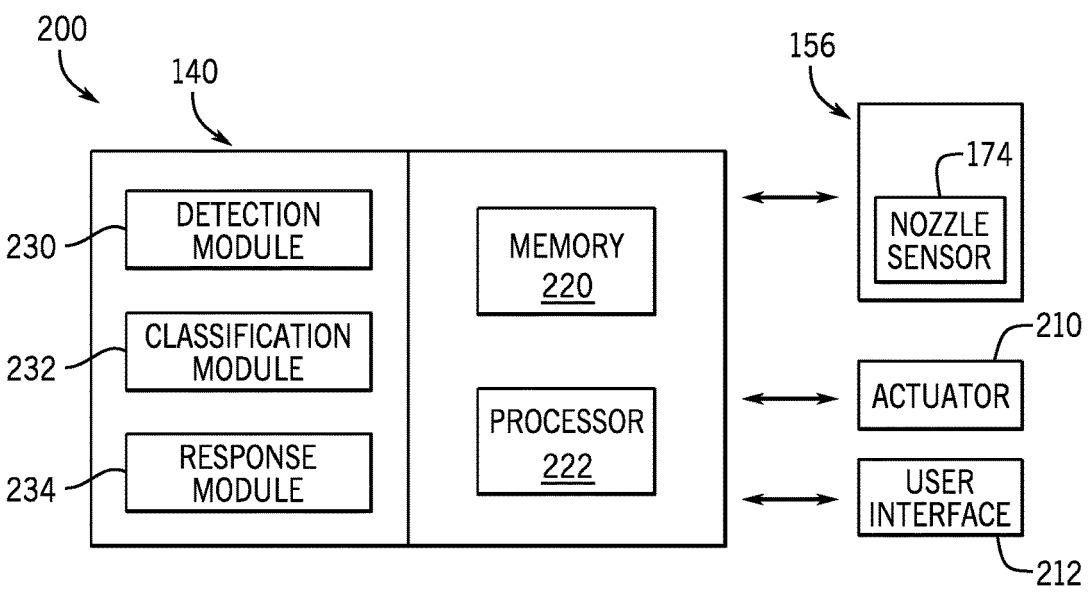
FIG. 4 is a block diagram depicting a functional organization of the baler nozzle evaluation system according to an example embodiment.

Reference is now made to FIG. 4, which is a block diagram of an example baler nozzle evaluation system 200. In one example, the baler nozzle evaluation system 200 may be considered to include or otherwise cooperate with the controller 144, the nozzle apparatus 156, and one or more actuators (e.g., the identification apparatus 210), as well as the user interface 212. As shown, the controller 144, the nozzle apparatus 156, and the identification apparatus 210 may be communication with each other in any suitable manner, including wired or wireless communication mechanisms.

As introduced above, the nozzle apparatus 156 may become clogged (e.g., a partial or complete blockage) by debris and/or solids within the preservative. As will now be discussed in greater detail, the baler nozzle evaluation system 200 may be configured to detect such clogs, classify the clogs, and/or respond to such clogs.

With respect an example configuration of the nozzle evaluation system 200, the controller 144 may include a processor 220 and memory 222 that implement one or more functional modules 230, 232, 234. In particular, the memory 222 may store instructions that are implemented by the processor 220. As one example of functional organization, the modules 230, 232, 234 may include a detection module 230, a classification module 232, and a response module 234.

Generally, the detection module 230 receives the signals from the nozzle sensor 174 associated with the nozzle apparatus 156 and determines that one or more of the nozzles of the nozzle apparatus 156 is subject to a clog. Such detection may involve a vibration pattern that deviates from one of an unclogged condition. As such, the detection module 230 may compare incoming vibration pattern to a nominal or threshold pattern representing an unclogged condition, and upon deviation from the nominal or threshold pattern, the detection module 230 may identify a clog condition.

Upon detection of a clog condition, the classification module 232 may operate to classify the clog condition. In particular, the classification module 232 may further evaluate the vibration pattern in order to determine the nature of the clog condition, such as the extent of the clog.

In one example, the classification module 232 may monitor the vibration pattern of signals using neural network or other type of machine learning. The training of the classification module 232 to identify and classify vibration patterns may take any form. In one example, a model associated with the classification module 232 may receive sample vibration patterns, including those representing known clog and unclogged conditions, as well as variations within clog conditions. Such vibration patterns may be represented with spectral signatures using recirculation networks, and backpropagation algorithms may be performed to provide further insights for training the resulting model. Upon such training, the classification module 232 enables the monitoring of different vibration patterns and the classification of such vibration patterns such that a clog condition may be identified. In some examples, the nature of the clog condition may also be identified by the classification module 232. In particular, the amount of blockage within the clog condition may be estimated (e.g., 25% blockage, 50% blockage, 100% blockage, and the like).

Figure 6:
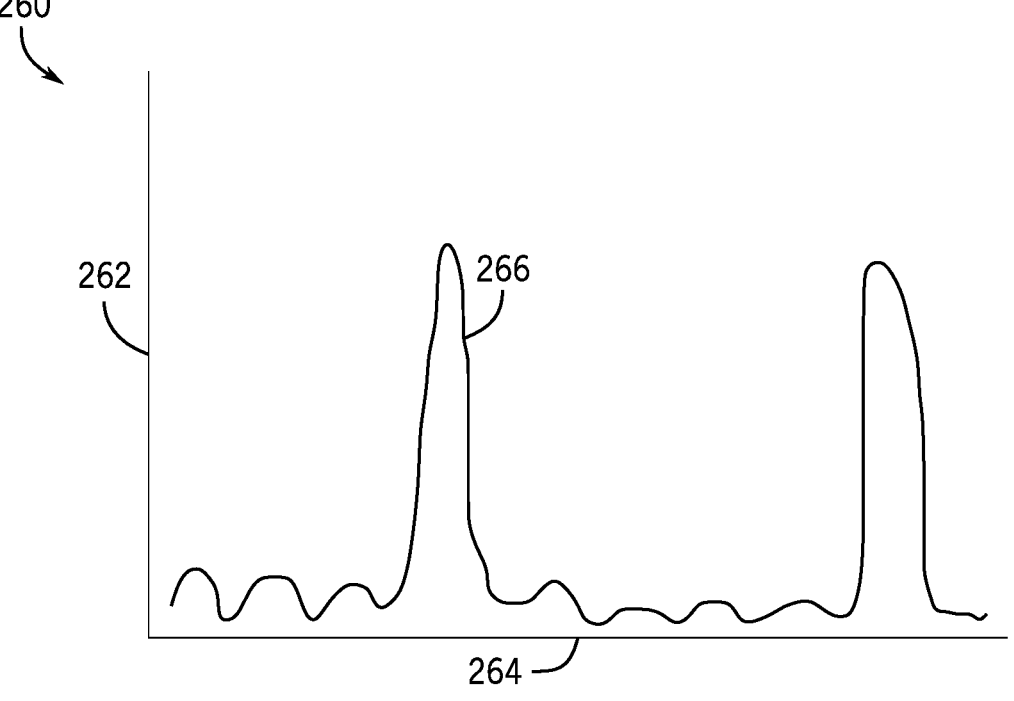
FIG. 6 is an example vibration pattern that may be considered in the baler nozzle evaluation system and method according to an example embodiment.

Reference is briefly made to FIG. 6, which is an example chart 260 of a vibration pattern 266 of sound emanating from a nozzle during operation expressed as amplitude of the vibrations on a vertical axis 262 as a function of time on a horizontal axis 264 expressed as a fast Fourier transform (FFT). Vibration patterns 266 such that that depicted in FIG. 6 may be used by the classification module 232 in order to identify and characterize the clog conditions.

Returning to FIG. 4, the nozzle evaluation system 200 further includes the response module 234 that, in response to identification and/or classification of the clog condition by the detection module 230 and the classification module 232, generates one or more commands in response to the clog condition, including alerting the operator of the clog condition via the user interface 212, recording information associated with the bale and/or clog condition, and/or activation of one or more actuators 210. As described below, actuator 210 may include tagging the subject bale with a tag that includes information about the clog condition may be associated with the bale.

Figure 5:
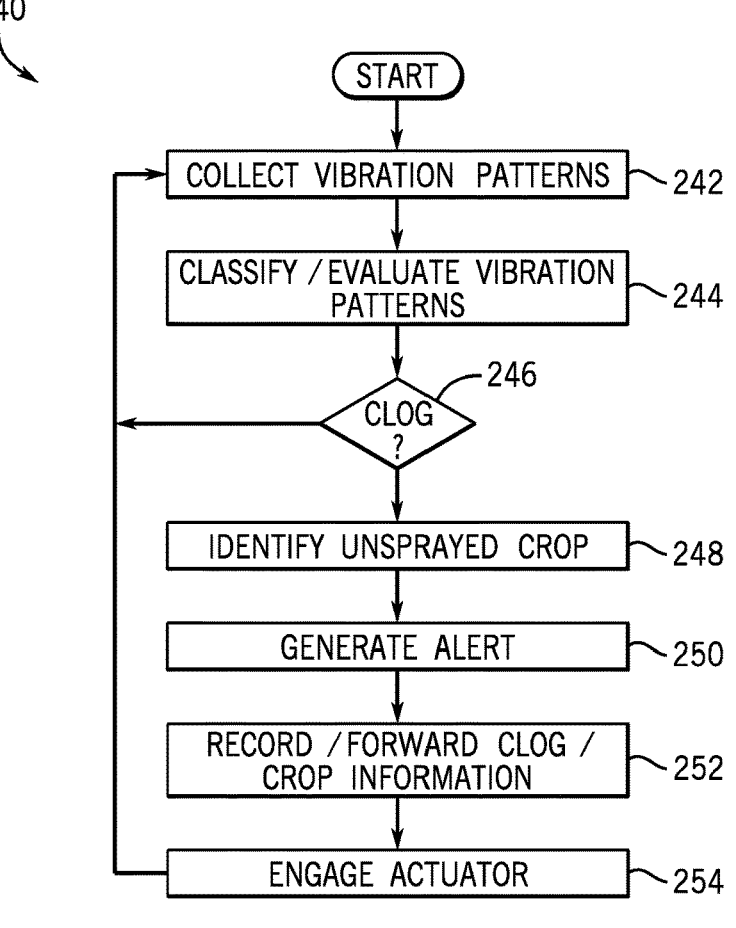
FIG. 5 is a flowchart depicting a method for detecting, evaluating, and/or addressing a clog condition within a baler nozzle apparatus according to an example embodiment.

Reference is additionally made to FIG. 5, which is a flowchart depicting one or more example steps of a process or method 240 for evaluating the baler nozzles, such as the nozzle apparatus 156 discussed above. Such a method 240 may be implemented with the baler nozzle evaluation system 200 described above, and is described below accordingly, but it should be noted that other systems and/or configurations may be provided.

In a first step 242, the system 200 may collect vibration patterns during operation. As noted above, the nozzle apparatus 156 may include or otherwise be associated with one or more sensors 174 that collect such vibration patterns that are provided to the controller 144.

In a further step 244, the system 200 evaluates the vibration patterns in order to detect and/or classify the vibration patterns. In a step 246, the system 200 determines if a clog condition is detected. If no clog condition is detected in step 246, the method 240 returns to step 242 to monitor further vibration patterns. However, if a clog condition is detected, the method 240 proceeds to step 248.

In step 248, the bale and/or portion of bale that failed to receive adequate preservative may be identified. Such identification may be enabled by recording the time and/or location associated with the subject vibration pattern such that, in consideration of the bale rate, the area of crop that was not sprayed may be estimated. Additionally, the bale may be assigned a unique identifier such that the bale may be later identified and/or referenced. As described below, information regarding the amount or nature of the preservative applied to the bale may be associated with the identifier.

In step 250, the system 200 may generate an alert or message for the operator as part of a diagnostics system (e.g., an alert on an operator interface 212). The alert may provide information about the clog condition of the nozzle apparatus 156 such that remedial steps may occur; and/or the alert may provide information about the bale that may have received inadequate preservative.

In step 252, the system 200 may record (e.g., stored in memory 222) information about the location, date, and time of the area in which the bales may not have been provided with adequate preservative. In some examples, the location, date, and time information may be provided to the control center 214 for further storage and/or consideration (e.g., uploaded to the cloud).

In a further step 254, the system 200 may engage and/or activate one or more actuators. In one example, the actuator may include actuator 210 that functions to tag a bale that may not have received adequate preservative. As noted above, the tag may be an RFID tag with information about the clog condition and/or the nature of the applied preservative. At a later time, the tag may be scanned to relay the information such any deficiency in the preservative application may be remedied. As a result, the system 200 and method 240 may provide a mechanism for identifying and tracking data related to a bale of crop material and/or the overall baling operation. In some examples, the actuator may include actions within the preservative application subsystem 150 to address the clog condition, such as cleaning or flushing operations.

Upon completion of step 254, the method 240 may continue monitoring, classifying, and addressing the condition of the nozzle apparatuses 156.

Accordingly, the nozzle evaluation system and method described herein enable the detection of a clogged nozzle apparatus and/or inadequate spray quality. In addition to providing such information for individual nozzle apparatuses and/or bales, such information enables more effective management of baler arrangements and/or baler operations.

As will be appreciated by one skilled in the art, certain aspects of the disclosed subject matter may be embodied as a method, system (e.g., a work vehicle control or spraying system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely exemplary embodiments of the present disclosure.

For the sake of brevity, conventional techniques related to work vehicle and engine operation, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A nozzle evaluation system for an agricultural baler with a nozzle apparatus having a nozzle, comprising:

a sensor associated with the nozzle and configured to collect vibration patterns of sound emanating from the nozzle of the nozzle apparatus during application of a fluid upon a respective bale; and a controller having a processor and memory architecture configured to:

receive the vibration patterns collected by the sensor during application of the fluid upon the respective bale;

evaluate the vibration patterns for the nozzle for a clog condition;

record, upon detecting the clog condition based on the vibration patterns, information associated with clog condition; and engage, upon detecting the clog condition, an actuator of the agricultural baler in which the actuator is an identification apparatus configured to attach an identification tag to the respective bale.

2. The nozzle evaluation system of claim 1, wherein the sensor is a microelectromechanical system (MEMS) sensor.

3. The nozzle evaluation system of claim 1, wherein the controller is configured to command the recording, upon detecting the clog condition, of the information associated with the clog condition on the identification tag attached by the identification apparatus to the respective bale.

4. The nozzle evaluation system of claim 1, wherein the controller is configured to command the recording, upon detecting the clog condition, of the information associated with the clog condition that includes a location of the respective bale upon discharge.

5. The nozzle evaluation system of claim 1, wherein the controller is configured to generate, upon detecting the clog condition, an alert for an operator of the agricultural baler.

6. The nozzle evaluation system of claim 1, wherein the controller is configured to communicate, upon detecting the clog condition, the information associated with the clog condition to a control center.

7. The nozzle evaluation system of claim 1, wherein the controller is configured to, upon detecting the clog condition, classify the clog condition.

8. The nozzle evaluation system of claim 7, wherein the controller is configured to classify the clog condition with a neural network.

9. The nozzle evaluation system of claim 1, wherein the sensor is embedded within the nozzle.

10. A baler arrangement, comprising:

a baler configured to collect crop material and form a bale from the crop material, the baler including a preservative application subsystem with a nozzle apparatus configured to spray the bale with a fluid during operation;

an identification apparatus configured to attach an identification tag to the bale;

a sensor associated with the nozzle apparatus and configured to collect vibration patterns of sound emanating from the nozzle apparatus during the spraying of the fluid upon the bale; and a controller having a processor and memory architecture configured to:

receive the vibration patterns collected by the sensor during the spraying of the fluid upon the bale;

evaluate the vibration patterns for the nozzle for a clog condition;

record, upon detecting the clog condition based on the vibration patterns, information associated with the clog condition on the identification tag attached by the identification apparatus to the bale; and engage, upon detecting the clog condition, the identi-
fication apparatus to attach an identification tag to
the bale.

11. The baler arrangement of claim 10, wherein the sensor
is a microelectromechanical system (MEMS) sensor.

12. The baler arrangement of claim 10, wherein the
controller is configured to command the recording, upon
detecting the clog condition, of the information associated
with the clog condition that includes a location of the bale
upon discharge.

13. The baler arrangement of claim 10, wherein the
controller is configured to generate, upon detecting the clog
condition, an alert for an operator of the baler.

14. The baler arrangement of claim 10, wherein the
controller is configured to communicate, upon detecting the
clog condition, the information associated with the clog
condition to a control center.

15. The baler arrangement of claim 10, wherein the
controller is configured to, upon detecting the clog condi-
tion, classify the clog condition.

16. The baler arrangement of claim 15, wherein the
controller is configured to classify the clog condition with a
neural network.

17. The baler arrangement of claim 10, wherein the sensor
is embedded within the nozzle apparatus.

\* \* \* \* \*